United States Patent [19]

Bagchi et al.

[11] Patent Number: 5,536,630

[45] Date of Patent: *Jul. 16, 1996

[54] USE OF ACID PROCESSED OSSEIN GELATIN AND CHAIN-EXTENDED ACID PROCESSED OSSEIN GELATIN AS PEPTIZERS IN THE PREPARATION OF PHOTOGRAPHIC ELEMENTS

[75] Inventors: Pranab Bagchi, Webster; Melvin D. Sterman, Pittsford; Jacob I. Cohen, Rochester, all of N.Y.

[73] Assignee: Eastman Kodak Company, Rochester, N.Y.

[*] Notice: The term of this patent shall not extend beyond the expiration date of Pat. No. 5,318,889.

[21] Appl. No.: 312,204

[22] Filed: Sep. 26, 1994

Related U.S. Application Data

[62] Division of Ser. No. 992,301, Dec. 21, 1992, Pat. No. 5,378,598.

[51] Int. Cl.⁶ .................................................. G03C 1/005
[52] U.S. Cl. .......................... 430/567; 430/643; 430/539; 430/545; 430/569; 430/640
[58] Field of Search ...................... 430/643, 539, 430/545, 569, 640, 567

[56] References Cited

U.S. PATENT DOCUMENTS

| | | | |
|---|---|---|---|
| 3,490,911 | 1/1970 | Burness et al. | 430/543 |
| 3,539,644 | 11/1970 | Burness at al. | 568/32 |
| 3,642,486 | 2/1972 | Burness et al. | 430/545 |
| 3,642,908 | 2/1972 | Burness et al. | 568/32 |
| 3,850,639 | 11/1974 | Dallon et al. | 430/415 |
| 4,021,244 | 5/1977 | Nagatomo et al. | 430/642 |
| 4,028,320 | 6/1977 | Sera et al. | 430/621 |
| 4,173,481 | 11/1979 | Sera et al. | 430/622 |
| 4,201,586 | 5/1980 | Hori et al. | 430/642 |
| 4,266,010 | 5/1981 | Nagatomo et al. | 430/642 |
| 4,421,847 | 12/1983 | Jung et al. | 430/621 |
| 4,427,768 | 1/1984 | Kitatani et al. | 430/621 |
| 4,433,043 | 2/1984 | Sawada et al. | 430/642 |
| 4,612,280 | 9/1986 | Okamura et al. | 430/621 |
| 4,673,632 | 6/1987 | Okamura et al. | 430/621 |
| 4,830,948 | 5/1989 | Ishikawa et al. | 430/642 |
| 4,877,724 | 10/1989 | Chen et al. | 430/621 |
| 4,921,785 | 5/1990 | Nakamura et al. | 430/621 |
| 4,990,931 | 2/1991 | Sato et al. | 430/138 |
| 5,178,997 | 1/1993 | Maskasky | 430/569 |
| 5,187,259 | 2/1993 | Sterman et al. | 430/642 |
| 5,318,889 | 6/1994 | Bagchi et al. | 430/642 |

FOREIGN PATENT DOCUMENTS

| | | | |
|---|---|---|---|
| 0206252 | 1/1984 | Germany | 430/569 |
| 3259652 | 10/1988 | Japan | 430/642 |
| 1304461 | 12/1989 | Japan | 430/569 |

OTHER PUBLICATIONS

Abstract J86015419–B, Konishiroku Photo KK, 1986.

Primary Examiner—Thomas R. Neville
Attorney, Agent, or Firm—Paul A. Leipold

[57] ABSTRACT

The invention provides a method of nucleating silver halide particles wherein said nucleation is carried out in the presence of acid processed ossein (APO) gelatin or chain-extended acid processed ossein (CE-APO) gelatin and the composition formed therefrom.

6 Claims, 11 Drawing Sheets

STABILITY CRITERION
$\Delta G_W \leqslant (3/2)kT$

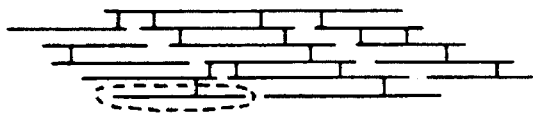
COLLAGEN OR OSSEIN — INFINITE MW
BASE OR ACID
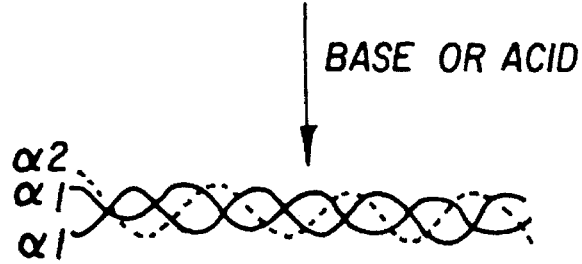
MW = 285,000
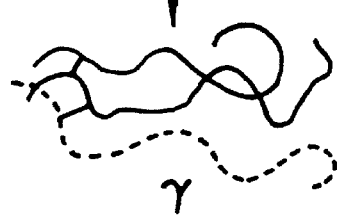
MW = 285,000
GELATIN
MW = 190,000
MW = 95,000
SUBALPHA MW < 95,000
FIG. 1

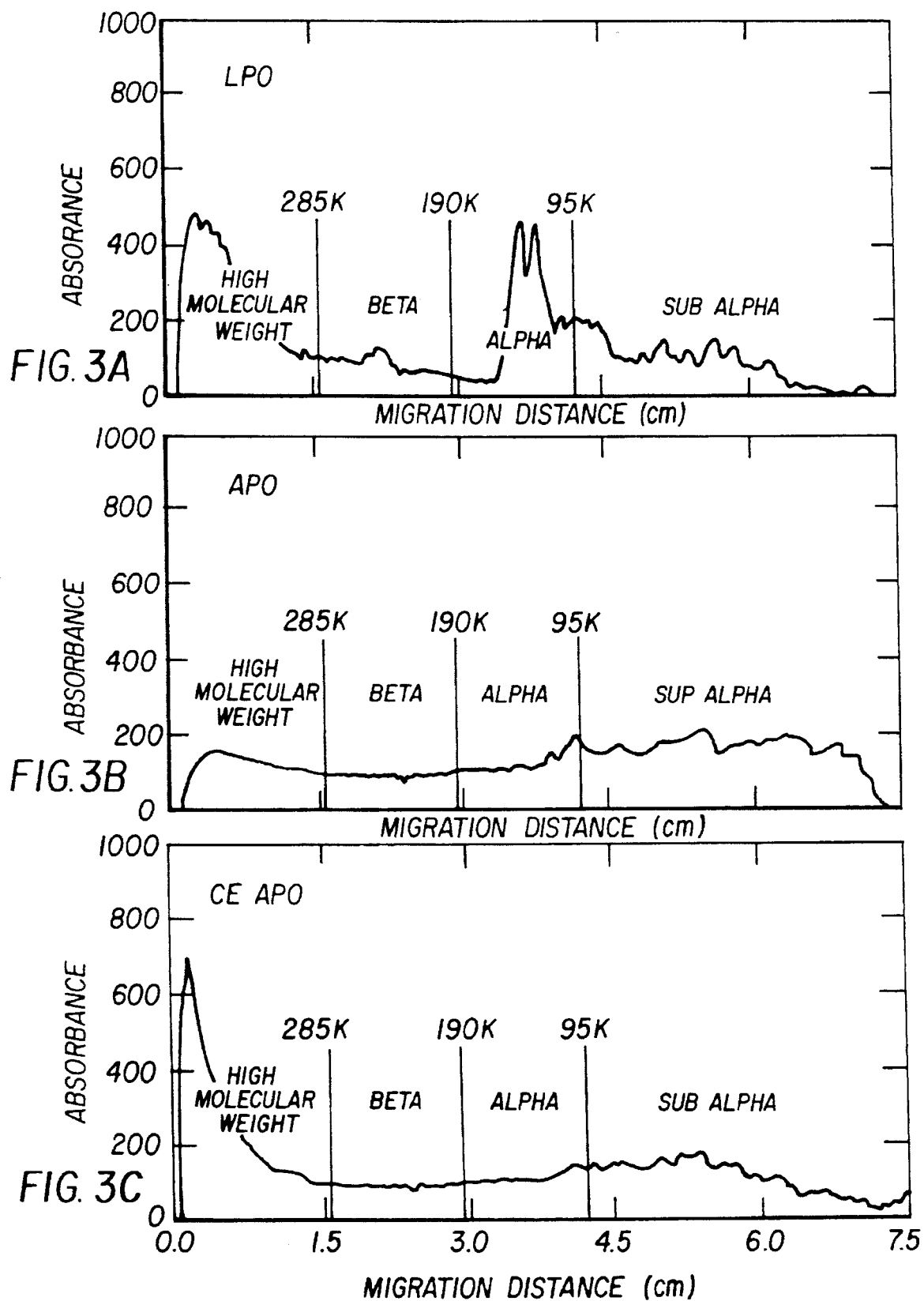

0.2 MICRONS 0.2 MICRONS 0.2 MICRONS

USE OF ACID PROCESSED OSSEIN GELATIN AND CHAIN-EXTENDED ACID PROCESSED OSSEIN GELATIN AS PEPTIZERS IN THE PREPARATION OF PHOTOGRAPHIC ELEMENTS

This is a Divisional of application Ser. No. 992,301 filed Dec. 21, 1992, U.S. Pat. No. 5,378,598.

FIELD OF THE INVENTION

This invention relates to the use of chain-extended acid-processed ossein gelatin in the preparation of photographic silver halide emulsions.

BACKGROUND OF THE INVENTION

R-1. T. H. James, "The Theory of the Photographic Process," 4th edition, Macmillan, New York, N.Y. 1977.

R-2. N. Itoh, J. Soc. Photogr. Sci. Tech., Japan, 52, 329 (1989); Y. Toda, in "Photographic Gelatin," H. Amman-Brass and J. Pouradier Ed., International Working Group for Photographic Gelatin, Fribourg, 1985.

R-3. P. Bagchi, J. Colloid and Interface Sci., 47, 86 (1974).

R-4. M. D. Sterman and J. L. Bello, "Chain Extended Gelatin," U.S. patent application Ser. No. 612,370 filed Nov. 14, 1990.

R-5. P. Bagchi, ACS Symp. Ser., 9, 145 (1975).

R-6. P. Bagchi, J. T. Beck, and L. A. Crede, "Methods of Formation of Stable Dispersions of Photographic Materials," U.S. Pat. No. 4,990,431 (1991).

R-7. J. I. Cohen, W. L. Gardner, and A. H. Herz, Advan. Chem. Ser., 45, 198 (1975).

R-8. P. Bagchi and S. M. Birnbaum, J. Colloid and Interface Sci., 45, 198 (1975).

R-9. H. A. Hoyen and R. M. Cole, J. Colloid Interface Sci., 41, 93 (1972).

R-10. R. R. Irani and C. F. Callis, "Particle Size: Measurement, Interpretation and Application," John Wiley, London, 1963.

R-11. B. Chu, "Laser Light Scattering," Academic Press, New York, 1974.

R-12. Anonymous, "Photographic Silver Halide Emulsions, Preparations, Addenda, Processing and Systems," Research Disclosure, 308, pp. 993–1015 (1989).

R-13. S. Nagamoto and K. Hori, "Silver Halide Light-Sensitive Material," U.S. Pat. No. 4,266,010 (1981).

R-14. S. Nagamoto and K. Hori, "Silver Halide Photographic Materials With Surface Layers Comprising Both Alkali and Acid Processed Gelatin," U.S. Pat. No. 4,021,244 (1977).

R-15. K. Hori and S. Nagamoto, "Photographic Light Sensitive Material," U.S. Pat. No. 4,201,586 (1980).

R-16. P. Bagchi and W. L. Gardner, "Use of Gelatin-Grafted and Case-Hardened Gelatin Grafted Polymer Particles For Relief From Pressure Sensitivity of Photographic Products," U.S. Pat. No. 5,026,632 (1991).

Gelatin has been used as the primary peptizer for the precipitation of silver halide grains and also as a coating vehicle in conventional photographic recording materials for over 120 years and remains one of the most important components of photographic systems (R-1, R-2). Cattle (cow) bones are the principal starting material for photographic gelatin. Sometimes, cattle and pig skins are also used. However, skin gelatins usually contain photographically active components and, therefore, their uses in photographic systems are limited (R-2). The manufacture of gelatin involves several stages. The first step is the deashing process to reduce the calcium (mainly calcium triphosphate or calcium apatite and calcium carbonate) content of the bones through a soak for about a week in a mineral acid bath. This decalcified material is referred to as collagen or "ossein."

Collagen or the ossein is a crosslinked and structured polypeptide (R-1),

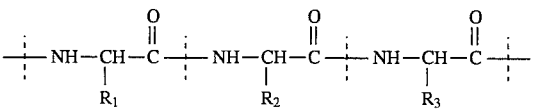

which is further treated either by lime or by a mineral acid to hydrolyze and denature the tertiary, secondary and partly the primary structures to produce water-soluble gelatin according to the schematics of FIG. 1. During the formation of gelatin collagen, which is composed of crosslinked triple helices of $\alpha_1$ and $\alpha_2$ chains (MW=285,000), is first denatured to the randomly coiled $\gamma$ form, then to a mixture of the $\beta_{11}$ (composed of two $\alpha_1$ chains MW=190,000), $\beta_{12}$ (composed of one $\alpha_1$ and one $\alpha_2$ chain, MW=190,000), and to single $\alpha_1$ and $\alpha_2$ stands (MW=95,000) and sub-alpha fragments (MW< 95,000). The solubilized gelatin fractions are leached and, for many applications, deionized by passage through ion exchange beds, chilled, noodled, and then dried for storage. Lime processing to produce gelatin requires between 2 to 3 months of treatment, whereas acid treatment usually needs several days (R-2). Consequently, for a manufacturing procedure, acid processing is definitely less expensive compared to lime processing and thus economically attractive. However, since acid hydrolysis occurs more rapidly, it is less controllable, and it leads to gelatins that usually have much lower average molecular weights than those derived from lime treatment. As a result, those gelatins may not provide adequate steric stabilization (R-3, R-5) to the emulsion grains. For this reason, an acid processed ossein (APO) gelatin was intermolecularly crosslinked or chain-extended (CE) (R-4) to produce a gelatin sample with viscosity (hence, effective molecular weight) comparable to standard lime-processed gelatin.

Dispersions of silver halide microcrystals (often referred to as emulsions in the photographic literature) with narrow grain-size distribution are usually precipitated by the so-called "double-jet" precipitation technique. Those emulsions usually contain gelatin as peptizer and steric stabilizer, and they make use of solutions of ~4 M $AgNO_3$ and 4 M halide salt solutions. Therefore, under precipitation conditions, all electrical double layer effects on the stability of the silver halide emulsions are virtually negligible. However, the halide ion or the silver ion concentration during the precipitation process has a profound effect on the morphology of the crystals formed during the precipitation process. In a double-jet precipitation device (FIG. 2, to be described later and in R-6), the concentration of silver ion (or halide ion, the two being related by the solubility product of silver halide) can be measured by a silver electrode and can be maintained at specific pAg ($=-\log_{10}$ [$Ag^+$]) values. The particle nucleation and growth process that take place at different silver ion or halide ion excesses, produce microcrystals of different morphology. In the case of AgBr, at pBr values greater than 3 generally cubic crystals are obtained, between 2 and 3 usually octahedral crystals are formed, and at pBr values below 2 platelets or tabular emulsion crystals are usually generated (R-1). However, from the colloid stability point of view, the particle size and crystal morphology are very important as they both determine the extent and the functional form of the van der Waals' attraction and steric or electric double layer repulsion (R-3, R-5).

The stability of a sterically stabilized colloidal system is primarily determined by the conformation of the adsorbed macromolecule on the particle surface and the resulting hydrodynamic thickness of the adsorption layer (R-1, R-8). For amphoteric polyelectrolytes, like gelatin and other proteins that exhibit a pH corresponding to zero net charge (PZC), the extent of the adsorbed amount (F) is usually highly pH dependent (R-8). That phenomenon has been attributed to the ionization induced expansion or contraction of isoelectric proteins. Measurements of the adsorbed layer thickness (L) by inelastic light scattering allows the characterization of the colloidal stability criterion of sterically stabilized dispersed systems.

As indicated above, the physical properties of gelatin, such as PZC, molecular weight and molecular weight distribution depend upon the nature of the processing, such as lime or acid. It has generally been noted that the PZC of lime processed (ossein) gelatin is around pH of 4.9 (R-7) and that of acid processed pigskin gelatin is much higher around pH of 9.1 (R-7). Using a series of acid processed ossein gelatins (APO) that have been processed in acid over 1,3,4 and 10 days, Toda (R-2) demonstrated that the APO gelatins have a much higher PZC and a broader distribution of PZC compared to lime processed gelatins. However, longer acid treatment times lead not only to sharpening of the PZC distribution, but also to movement of PZC to much lower pH. As indicated above, longer acid treatment produces gelatins with much lower molecular weight distributions, and those gelatins are generally not considered suitable for adequate peptization of silver halide crystals used in photography. Higher molecular weight (short acid treatment) acid processed gelatins (like pigskin gelatin) have been used infrequently in preparation of photographic emulsions because of the high PZC (R-7). High PZC Ag-halide peptizers under many precipitation conditions (pH and pAg) can lead to sensitized flocculation rather than peptization depending upon the PZC (pAg) of the silver halide salt in question. A further disadvantage of high PZC gelatins is that they coacervate when mixed with regular lime processed ossein gelatin under normal coating pH conditions 3–8. Therefore, the cost advantage of acid processed ossein gelatins can be exploited only if acid processed gelatins have sufficiently high molecular weight and reasonable low PZC to avoid adverse colloid chemical interactions. Therefore, there is a need for an invention that will render relatively inexpensive acid processed ossein gelatin usable in photographic systems.

Even though acid processed gelatins have not found extensive use in photographic systems because of the problems outlined above, limited disclosure has been located of its use in overcoats, away from the silver halide containing sensitized layers and in the interlayers between the sensitized layer [Nagamoto et al., U.S. Pat. No. 4,266,010 (R-13); 4,021,214 (R-14); and Hozi et al., U.S. Pat. No. 4,201,586 (R-15)]. It has been reported in those publications that when acid processed gelatins, extended acid processed gelatins or acid processed gelatins in combination with standard lime processed gelatins, are utilized to produce photographic overcoat layers, the photographic products have greater abrasion resistance. In those disclosures, the term "extended gelatin" has been defined as "Gelatin that has been chemically modified by grafting onto it small molecules or other polymers, via the gelatin amine, immine or carboxyl groups, to form either a water soluble or water dispersible polymeric or colloidal product."

Also such gelatins in the prior disclosures are in general acid processed skin gelatins as opposed to acid processed ossein gelatins.

PROBLEM TO BE SOLVED BY THE INVENTION

Therefore, there is a desire to lower costs by utilizing inexpensive acid processed ossein gelatin in preparation of photographic silver halide emulsions.

SUMMARY OF THE INVENTION

An object of this invention is to overcome disadvantages of prior photographic compositions.

A further objective of this invention is to reduce the cost of photographic emulsions by utilizing acid processed ossein or chain-extended acid processed ossein gelatins in the preparation of photographic emulsions.

Another objective of this invention is to create a high molecular weight acid processed ossein gelatin that provides an adequate gelatin layer thickness in Ag-halide emulsions for steric stabilization and peptization during nucleation and growth of the emulsions to sufficiently large particle size.

These and other objects of this invention are generally achieved by the use of acid processed ossein and chain-extended acid processed ossein gelatins in the precipitation of silver halide photographic emulsions.

BRIEF DESCRIPTION OF DRAWINGS

FIG. 1 illustrates the schematics for the preparation of gelatin.

FIGS. 3a, 3b, and 3b illustrate the electrophoretic molecular weight distributions of various gelatins.

ADVANTAGEOUS EFFECT OF THE INVENTION

Figure 2:
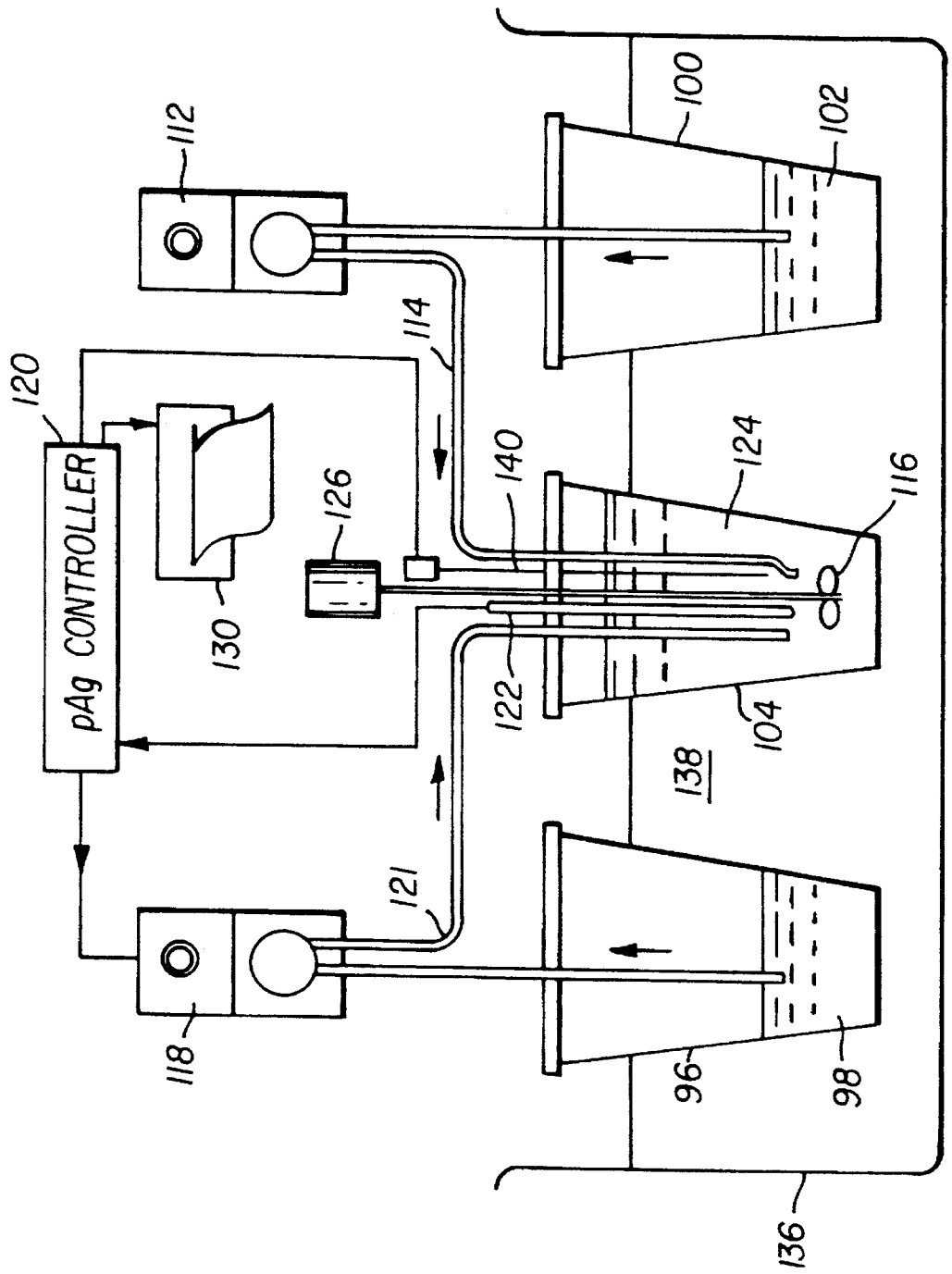
FIG. 2 illustrates the schematic of a double jet precipitation device.
Figure 4A:
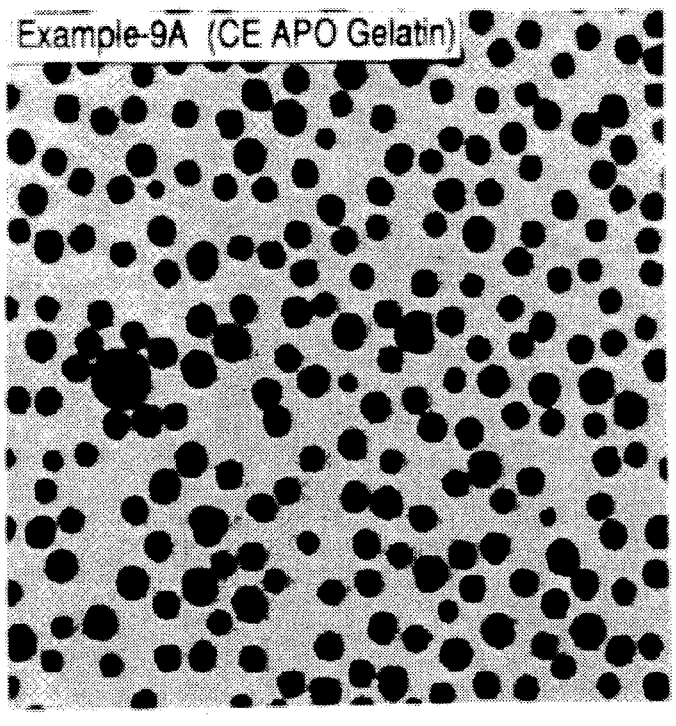
FIG. 4 illustrates transmission electron micrographs of AgBr emulsions prepared with CE-APO gelatin of Example 3 (Examples 9A, 10A, and 11) and APO gelatin of Example 2 (Examples 9B and 10B).
Figure 4B:
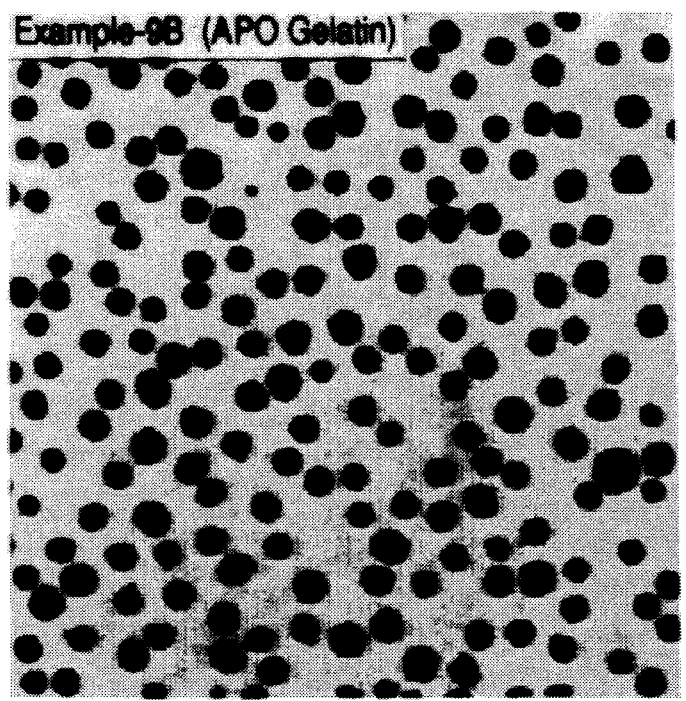
Figure 4C:
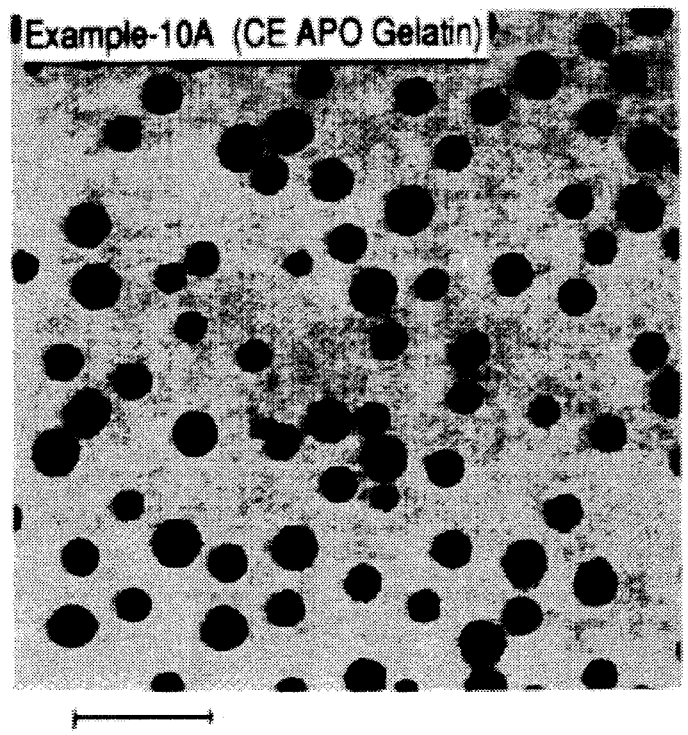
Figure 4D:
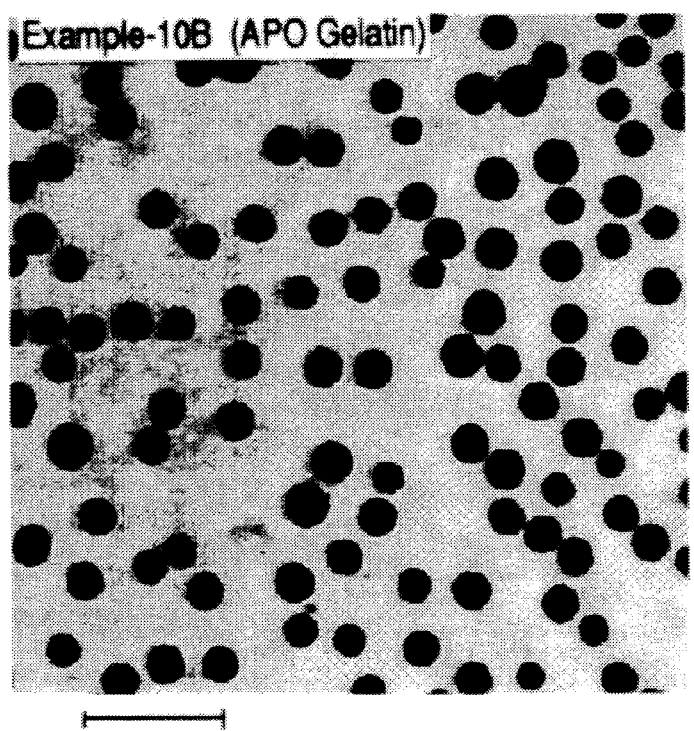
Figure 4E:
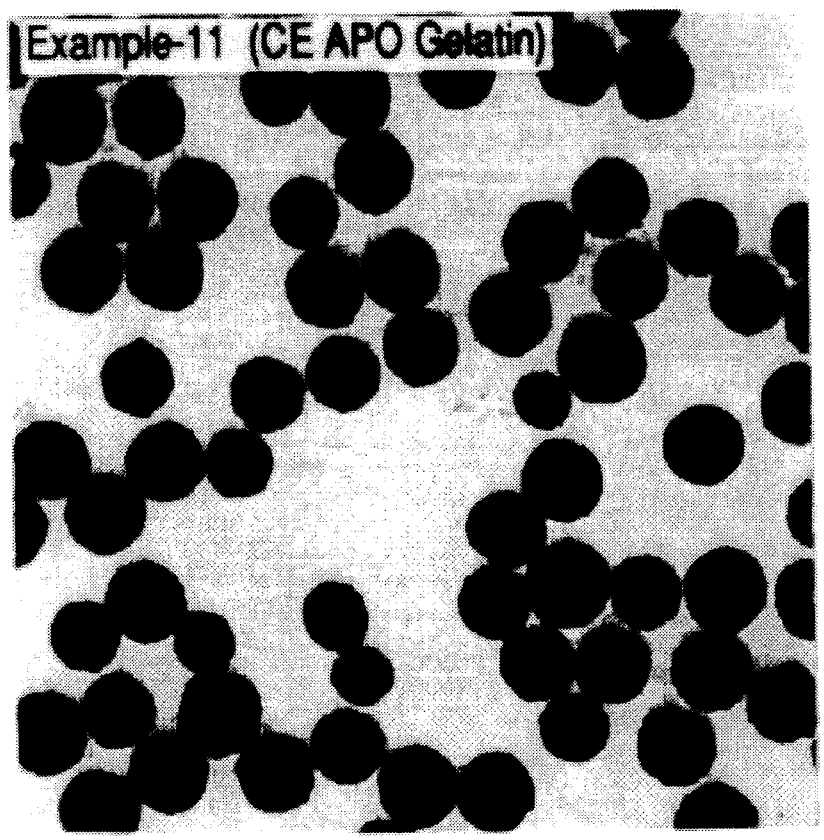

A major advantage is that acid processed ossein gelatin is much less expensive compared to standard lime processed ossein gelatin (APO). Therefore, the ability to fabricate components of photographic products using such gelatins vastly reduces the cost of such products. The additional advantage of using the preferred chain-extended acid processed ossein gelatin (CE-APO) is that such gelatins with increased molecular weight provide better peptization and colloid stability of larger silver halide crystals. The APO gelatins and the CE-APO gelatins of this invention having IEP values (pH=5.5 to 6.5) closer to those of lime processed ossein gelatins (IEP of about pH 4.9) produce photographic emulsions that are completely compatible with lime processed ossein gelatin, which is a great advantage, unlike other acid processed skin gelatins such as pigskin gelatin, which has an IEP of about pH=9.1.

This invention creates a high molecular weight acid processed ossein gelatin for the peptization of silver halide emulsions that have isoelectric pH close to that of standard lime processed ossein gelatin. Therefore, emulsions precipitated using such gelatins are continuously compatible with standard lime processed ossein gelatin over concentration and pH ranges suitable for use in photographic systems. This is an advantage as the chain-extended acid processed ossein gelatin as at least part of the emulsion is cheaper than presently used materials.

DETAILED DESCRIPTION OF THE INVENTION

For the purpose of this invention, we define "chain-extended gelatins" as follows:

"Chain-extended gelatins are gelatin samples that are produced by the chemical linking of chemically similar (but could be different in chain lengths) gelatin molecules to create a higher molecular weight gelatin sample, which are still water soluble as opposed to a "hardened" product."

Again, for the purpose of this invention, we define "cross-linked" as follows:

"Chemical bonding between two (polymer) molecules, whereas cross-linking may be achieved between two dissimilar polymer molecules, for the purpose of our invention we use this term for cross-linking between two chemically similar gelatin molecules, that may be different in molecular weight. High degree of cross-linking usually renders gelatin insoluble in water."

With reference to photographic prior art, the term "hardening" implies the following:

"Cross-linking to create close to infinite molecular weight gelatin matrix in coatings. The product is insoluble in hot, even caustic water. This state is necessary to prevent dissolution of photographic gelatin coatings during processing."

The term "ossein gelatin" used in this invention is restricted to the following definition:

"Gelatin formed from cattle bones."

The gelatin useful for this invention is formed by intermolecular chain-extension of acid processed ossein gelatin. The parent acid-processed ossein gelatins useful for this invention are those that have isoelectric pH (IEP) values between 5.5 and 6.5. Such APO gelatins of this invention are characterized by having a viscosity between 4 and 6 cP (m P sec) at low shear rates (i.e., below 100 1/sec) at 40° C. of a 6.16% solution in distilled water.

The chain-extended APO gelatins suitable for the invention are those with IEP value between 5.5 and 6.5. The CE-APO gelatins of this invention are characterized by having a viscosity between 7 and 11 cP (m P sec) at low shear rates (i.e., below 100 1/sec) at 40° C. of a 6.16% solution in distilled water. The CE-APO gelatins of this invention are prepared in a controlled manner, such that the final CE-APO product is completely water soluble and does not contain any insoluble fraction.

Although the chain-extended acid processed gelatin compositions of the invention can be prepared from a gelatin solution containing from about 6% and about 18% (dry weight) gelatin, it is preferred that the gelatin concentration range from about 10% to about 15% by weight. Further, while the concentration of the chain-extending agent ranges from about 0.25 to about 5 millimoles per 100 grams (dry weight) of gelatin, preferred amounts range from about 1 to about 3 millimoles per 100 grams of gelatin.

In the process of the invention, the gelatin solution containing the chain-extending agent of the invention is heated at a temperature ranging from about 40° to about 60° C., preferably 40° to about 50° C., at a pH ranging from 4.5 and 7, preferably 5.4 to 6, for from about 1 to about 8 hours, preferably for about 2 to about 4 hours. The pH is monitored and adjusted at the beginning and the end of the process.

The "chain-extension agent" of this invention can be any suitable gelatin cross-linking agent utilized at sufficiently low concentrations. Such chain-extension agents are described fully in references R-1 and R-16 and are incorporated herein by reference. The preferred chain-extension agents, however, are bis-(vinyl sulfonyl) compounds because they produce intermolecular bonds that are stable to hydrolysis, Any suitable bis-(vinyl sulfonyl) compound can be used in the practice of the invention. Preferred classes of such suitable materials include those having the formulae

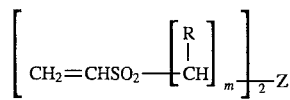

or

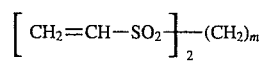

in which m is an integer of from 1 to 4, Z is a heteroatom such as oxygen, nitrogen, sulfur, and the like, and R is hydrogen or lower molecular weight alkyl, such as methyl, ethyl, isopropyl, butyl, pentyl, and the like, which groups can, in turn, be further substituted. Most preferred are bis-(vinyl sulfonyl) methane and bis(vinyl sulfonyl methyl) ether because they produce intermolecular bonds that are stable to hydrolysis.

Preferred chain-extended gelatins of the invention can be used in various kinds of gelatin photographic emulsions including orthochromatic, panchromatic, and infrared emulsions, as well as in x-ray and other nonoptically sensitized emulsions. They can be added to the emulsions before or after the addition of any sensitizing dyes, and they are effective in sulfur and gold sensitized silver halide emulsions.

The chain-extended gelatins of the invention can be used in bead coating and curtain coating operations or can otherwise be coated onto a wide variety of supports. Typical supports include those generally employed for photographic elements including cellulose nitrate film, cellulose acetate film, polyvinyl acetal film, polystyrene film, polyethylene terephthalate film, and related films or resinous materials as well as glass, paper, metal, wood, and the like. Supports such as paper that are coated with α-olefin polymers, particularly polymers of α-olefins containing 2 to 10 carbon atoms such as, for example, polyethylene, polypropylene, ethylene butene copolymers, and the like can be employed.

The gelatin compositions of the invention can also contain additional additives, particularly those known to be beneficial in photographic emulsions such as optical sensitizers, speed increasing materials, plasticizers, and the like, including those disclosed in U.S. Pat. No. 3,128,180 which is hereby incorporated herein by reference. Thus, the chain-extended gelatin compositions of the invention can be used in photographic elements intended for color photography and can contain color-forming couplers or be used as emulsions to be developed by solutions containing couplers or other color generating materials or emulsions of the mixed packet type.

Silver halides employed in photographic emulsions of the invention include any of the photographic silver halides such as silver bromide, silver iodide, silver chloride, silver chlorooiodide, silver bromoiodide, silver chlorobromide, and the like. The silver halide crystals may be cubic, octahedral, or tabular grain. The silver halides used can be those which form latent images predominantly on the surface of the silver halide grains or those which form latent internal images. Hardened emulsions of the gelatins of the invention can be used in color paper, transparency, color negative, diffusion transfer, or black-and-white systems.

For color photographic systems the layer will contain appropriate dye-forming coupler dispersions.

The silver halide emulsions of this invention, prepared using CE-APO gelatins include any of the photographic silver halides such as silver bromide, silver chloride, silver iodide, silver chlorobromide, silver bromoiodide, silver chlorobromide, and the like. The silver halide crystals may be cubic, octahedral, tabular grains (thickness 30 nm and larger) or of the Lippmann type (R-1). The APO or CE-APO gelatin can be present in the emulsion preparation during nucleation or growth or at both stages of the inventive process.

Any suitable apparatus or reactor can be used to carry out the chain extension reaction of the invention, including any suitable stirring and heating means. Any suitable means available to those skilled in the art can be used to adjust the pH of the gelatin composition in accordance with the invention.

Photographic elements can be prepared using the chain-extended gelatins of the invention. Suitable elements include a support such as a polyester or polyolefin film, a layer of the chain-extended gelatin of the invention on the support, and any suitable hardener including those disclosed in any of the patents incorporated herein by reference.

The invention is further illustrated but is not intended to be limited by the following examples. All parts and percentages are by weight unless otherwise indicated:

EXAMPLES 1-8

Preparation and Characteristics of Chain-Extended Acid Processed Ossein Gelatins A. Differences in Molecular Weight Distributions Between Lime Processed and Acid Processed Ossein Gelatins A lime processed deionized ossein gelatin called gelatin of Example 1, and an acid processed ossein gelatin called gelatin of Example 2, were analyzed for molecular weight distribution by gel electrophoresis described by Itoh (R-2). The gel used was a Pharmacia (4/30) polyacrylamide material. Both parent gelatins of Examples 1 and 2 were obtained from Eastman Kodak Company. The electrophoretic molecular weight distributions of the two gelatins are shown in FIG. 3. The calibration markers in FIG. 3 are those for the $\alpha$, $\beta$, and $\gamma$ chains. The low shear viscosities at 6.16% gelatin concentration and at 40° C. along with the area percents of the weight fractions of the two gelatins of Examples 1 and 2 are also shown in Table 1. The results of FIG. 3 and Table I clearly indicate that the APO gelatin is definitely of much lower average molecular weight than the LPO gelatin. This is why the APO gelatins need to be chain-extended for adequate gel-strength and peptizing action comparable to that exhibited by LPO gelatins.

TABLE I

Molecular Weight Fractions and Viscosity of Lime Processed Ossein (LPO) Gelatin of Example-1 (A), Those of Acid Processed Ossein (APO) Gelatin of Example-2 (B) and Those of Chain-Extended Acid Processed Ossein (CE-APO) Gelatin of Example-3 (C)

| Region | Molecular Weight Range | LPO Gelatin of Example-1 [A] Area % | APO Gelatin of Example-2 [B] Area % | CE-APO Gelatin of Example-3 [C] Area % |
|---|---|---|---|---|
| High MW | >285K | 37.4 | 18.4 | 36.9 |
| Beta | 190K to 285K | 12.4 | 14.7 | 17.2 |
| Alpha | 95K to 190K | 23.2 | 16.7 | 11.3 |
| Sub Alpha | <95K | 27.0 | 50.3 | 34.6 |
| Low Shear Viscosity $\eta_{6.16\%}^{40° C.} \rightarrow$ (cP or mP*s) | Whole Sample | 8.2 | 4.8 | 8.9 |

B. Preparation of Chain-Extended Acid Processed Ossein Gelatins and Their Physical Properties All chain extension reactions were carried out by reacting a gelatin solution with bis-vinylsulfonyl methane,

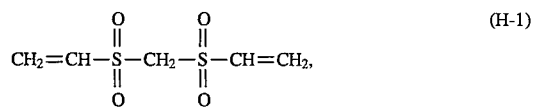

(H-1)

at appropriate concentrations at 45° C. and at a pH value between 5.7 to 6.1, usually for periods of about 4 hours. The gelatin concentration most suitable for such reactions was found to be around 12.5%. Compound (H-1) was added to the reaction mixture using about a 2% solution at dry weight levels based on dry weight of gelatin, as indicated in Table II. After completion of the chain-extension reaction, the gelatin samples were chill set at 4° C., noodled and converted to dry form for characterization and other emulsion studies.

The viscosity of a 6.16% solution of each gelatin sample was measured using a Brookfield viscometer at a shear rate of about 100/sec. The inherent viscosity, (η), of a 0.25% solution containing 0.10N KNO$_3$ was measured using a Cannon-Fenske capillary viscometer. These viscosity measurements were made at 40.0°±0.02° C. Viscosity data, ash content, and pH data for the CE gelatins are summarized in Table II. Polyacrylamide gel-electro-phoretic molecular weight distributions were also determined to obtain an estimate of the high molecular weight fraction, i.e., the molecular weight range from about 2.85×10$^5$ to about 4.0× 10$^5$ in each of these gelatin samples. The results are also shown in Table II. It is observed, as expected, that the high molecular weight fraction values parallel the inherent viscosity values and the quantity of hardener used.

TABLE II

Preparation and Physical Characteristics of the CE-APO Gelatins

| Gelatin Identification | Parent Gelatin | % BVSM (BOGW)$^c$ | $\eta_{6.2\%}^{40°\,C.}$ Gelatin cP or mP*S | $\{\eta\}_{0.25\%}^{40°\,C.}$ Gelation (0.1N KNO$_3$) cP or mP*S | IEP or PZC pH | % Ash Content$^a$ | Area % High MW Fraction$^b$ |
|---|---|---|---|---|---|---|---|
| Example-2 | — | — | 4.8 | 0.289 | 5.7 | 0.15 | 18.4 |
| Example-3 | Example-2 | 0.60 | 8.9 | 0.419 | 5.8 | 0.18 | 36.9 |
| Example-4 | Example-2 | — | 5.2 | 0.334 | 6.1 | 0.03 | 16.2 |
| Example-5 | Example-4 | 0.20 | 5.1 | 0.338 | 6.0 | 0.03 | 21.9 |
| Example-6 | " | 0.40 | 5.8 | 0.379 | 5.9 | 0.05 | 31.7 |
| Example-7 | " | 0.60 | 7.1 | 0.435 | 5.9 | 0.06 | 39.9 |
| Example-8 | " | 0.80 | 9.7 | 0.540 | 5.8 | 0.08 | 60.4 |

$^a$If 100% of ash is CaO (main component of ash), then for 0.2% ash, 100 g of gelatin will contain 0.0035 moles of Ca$^{++}$.
$^b$From gel-electrophoresis data.
$^c$BOGW = Based on Gelatin Weight.

The parent APO gelatin of Example 2, although deionized, contained an ash residue of 0.15% based on the dry weight of the gelatin. In order to further reduce the ash content, an additional deionization of the gelatin was carried out by eluting a solution of this gelatin through a mixed bed ion exchange column consisting of Amberlite resins IR 100 and IRA 900. That procedure further reduced the ash content to 0.03%, and the resulting, further-deionized parent APO gelatin was designated as gelatin of Example 4. The ash composition of the parent APO gelatin of Example 2 is shown in Table III. From Table III, by far the largest contributor to the ash is CaO, about 40% by weight of the total ash. As indicated in Table II, a 0.2% ash consisting of all CaO contributes only 0.035 moles of Ca$^{++}$ per 100 g of gelatin. That amount of Ca$^{++}$ will contribute insignificantly to the ionic strengths in all the experiments for which ionic strengths were adjusted.

TABLE III

Ash Composition of the Parent APO Gelatin of Example-2
Ash Composition (Total Ash = 0.15%)

| Element | % Ash | mg/100 g of Sample |
|---|---|---|
| Aluminum | 1.5 | 2.25 |
| Antimony | 0.02 | 0.03 |
| Barium | 0.05 | 0.075 |
| Boron | 0.07 | 0.105 |
| Calcium | 40 | 60 |
| Chromium | 0.06 | 0.09 |
| Cobalt | 0.08 | 0.12 |
| Copper | 0.15 | 0.225 |
| Iron | 2 | 3 |

TABLE III-continued

Ash Composition of the Parent APO Gelatin of Example-2
Ash Composition (Total Ash = 0.15%)

| Element | % Ash | mg/100 g of Sample |
|---|---|---|
| Lead | 0.0025 | 0.00375 |
| Magnesium | 6 | 9 |
| Manganese | 0.03 | 0.045 |
| Molybdenum | 0.004 | 0.006 |
| Nickel | 0.3 | 0.45 |
| Palladium | 0.001 | 0.0015 |
| Phosphorus | 4 | 6 |
| Platinum | 0.3 | 0.45 |
| Silicon | 1 | 1.5 |

TABLE III-continued

Ash Composition of the Parent APO Gelatin of Example-2
Ash Composition (Total Ash = 0.15%)

| Element | % Ash | mg/100 g of Sample |
|---|---|---|
| Silver | 0.008 | 0.012 |
| Sodium | 20 | 30 |
| Strontium | 0.1 | 0.15 |
| Tin | 0.025 | 0.0375 |
| Titanium | 0.08 | 0.12 |
| Vanadium | 0.007 | 0.0105 |
| Zinc | 0.01 | 0.015 |
| Zirconium | 0.002 | 0.003 |

The point of zero change (PZC) and the isoelectric pH (IEP) are synonymous for amphoteric polyelectrolytes like proteins and gelatins (R-7). Besides microelectrophoresis, one of the methods for the determination of the IEP or the PZC of such proteins is to exhaustively deionize such gelatins and then measuring the pH of the resulting solution (R-7). This was done for all the samples indicated in Table II, according to the deionization procedure indicated earlier. It is seen that the parent APO gelatins along with the various chain-extended samples have IEP values between 5.7 and 6.1. It is inferred from those data that within experimental variability the chain-extension process using H-1, did not alter the IEP of the modified gelatin samples, even though up to a threefold increase in the high molecular weight fraction was achieved.

A comparison of the molecular weight distributions of the LPO gelatin of Example 1 and that of the APO gelatin of Example 2 is given in FIG. 3. Table I and Table II indicate the following general features:

1) Molecular weight distribution of all the gelatin samples are indeed very broad, between 1K to 400K.
2) APO gelatins show much lower viscosity compared to LPO gelatins.
3) LPO gelatins have a substantial high molecular weight peak with a typical twin ($\alpha 1$ & $\alpha 2$) peak in the alpha region.
4) APO gelatins have only a very limited high molecular weight region but a pronounced subalpha region with no peaks in the alpha region as in the case of LPO gelatins.
5) The chain-extension procedure described in this invention is able to create an APO gelatin with a high molecular weight peak (and viscosity) similar to that of regular LPO gelatins, but the CE-APO gelatins do not show twin peaks in the alpha region as do the LPO gelatins.

The amino acid compositions of parent APO gelatin and its various chain-extended analogs were determined by standard procedures[1] and are reported in Table IV. These measured numbers are the means of 7 determinations along with the corresponding standard deviations to provide the degree of precision of these measurements. In column 5 are listed published amino acid residue numbers[1] for standard LPO gelatins. Comparison of the data for LPO and the parent APO gelatin of Example 2 show that their compositions are very similar, a result to be expected because of the similarity of the source material. An important difference, on closer examination, is the ORN content. ORN is not a natural gelatin peptide. It is formed by base hydrolysis of ARG during the liming process. As indicated in the footnote of Table IV, ORN amounts vary between 1.5 to 3.5% based upon liming conditions and time. The most significant conclusion regarding ORN is that all the APO gelatins show negligible amounts of ORN as a result of the absence of lime treatment. Existence of significant amount of ORN, therefore, is an indication of liming treatment.

TABLE IV

Amino Acid Composition of APO, LPO and CE-APO Gelatins

| Amino Acid | Structure | Mean Residue per 1000 of 7 Measurements of APO Gelatin of Example-2 | Standard Deviation of 7 Determinations of APO Gelatin of Example-2 | Residue per 1000 of Standard LPO Gelatin[a] | Residue per 100 of Further Deionized APO Gelatin of Example-4 | Residue per 1000 of CE-APO Gelatin of Example-8 |
|---|---|---|---|---|---|---|
| Glycind (GLY) | $H_2N-CH_2-COOH$ | 330.74 | 1.75 | 347 | 326.61 | 329.41 |
| Proline (PRO) | (pyrrolidine-COOH) | 122.08 | 0.67 | 120 | 125.70 | 124.68 |
| Alanine (ALA) | $CH_3-CH(NH_2)-COOH$ | 110.57 | 0.68 | 113 | 109.58 | 111.29 |
| Hydrooxyproline (HYP) | (HO-pyrrolidine-COOH) | 103.67 | 0.60 | 96 | 107.64 | 106.84 |
| Glutamic Acid (GLU) | $HOOC-(CH_2)_2-CH(NH_2)-COOH$ | 73.60 | 0.64 | 74 | 71.69 | 72.42 |
| Arginine (ARG) | $HN=C(NH_2)-NH-(CH_2)_3-CH(NH_2)-COOH$ | 48.85 | 0.18 | 48 | 49.78 | 48.97 |
| Aspartic Acid (ASP) | $HCOO-CH_2-CH(NH_2)-COOH$ | 43.94 | 0.73 | 44 | 43.97 | 43.65 |
| Serine (SER) | $HO-CH_2-CH(NH_2)-COOH$ | 35.42 | 0.38 | 31 | 35.58 | 34.18 |
| Ammonia ($NH_3$) | $-C(=O)-NH_2$ | 28.12 | 1.19 | — | 3.10 | 3.05 |
| Lucine (LEU) | $CH_3-CH(CH_3)-CH_2-CH(NH_2)-COOH$ | 25.83 | 0.64 | 24 | 25.29 | 25.68 |

TABLE IV-continued

Amino Acid Composition of APO, LPO and CE-APO Gelatins

| Amino Acid | Structure | Mean Residue per 1000 of 7 Measurements of APO Gelatin of Example-2 | Standard Deviation of 7 Determinations of APO Gelatin of Example-2 | Residue per 1000 of Standard LPO Gelatin[a] | Residue per 100 of Further Deionized APO Gelatin of Example-4 | Residue per 1000 of CE-APO Gelatin of Example-8 |
|---|---|---|---|---|---|---|
| Lysine[d] (LYS) | $H_2N-(CH_2)_4-CH-COOH$ <br> $\quad\quad\quad\quad\quad\quad\quad\;\; |$ <br> $\quad\quad\quad\quad\quad\quad\quad NH_2$ | 25.81 | 0.18 | 27 | 26.32 | 24.91 |
| Valine (VAL) | $CH_3-C-CH-COOH$ <br> $\quad\quad\; | \quad\; |$ <br> $\quad\;\;CH_3\;\;NH_2$ | 17.88 | 0.71 | 22 | 17.16 | 19.34 |
| Threonine (THR) | $CH_3-CH-CH-COOH$ <br> $\quad\quad\quad\;\; | \quad\; |$ <br> $\quad\quad\quad OH\;\;NH_2$ | 17.33 | 0.30 | 17 | 17.27 | 17.11 |
| Phenylalanine (PHE) | 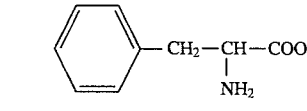 | 13.23 | 0.17 | 12 | 13.34 | 13.32 |
| Isoleucine (ILE) | $CH_3-CH_2-CH-CH-COOH$ <br> $\quad\quad\quad\quad\quad\; | \quad\; |$ <br> $\quad\quad\quad\quad\; CH_3\;\;NH_2$ | 9.95 | 0.22 | 12 | 9.69 | 10.22 |
| Hydroxylsine[d] (HYL) | $H_2N-CH-(CH_2)_3-CH-COOH$ <br> $\quad\quad\quad\; | \quad\quad\quad\quad\quad\; |$ <br> $\quad\quad\quad OH\quad\quad\quad\;\; NH_2$ | 6.39 | 0.10 | 5 | 6.54 | 5.50 |
| Methionine (MET) | $CH_3-S-(CH_2)_3-CH-COOH$ <br> $\quad\quad\quad\quad\quad\quad\quad\quad\; |$ <br> $\quad\quad\quad\quad\quad\quad\quad\; NH_2$ | 6.10 | 0.52 | 4 | 5.69 | 5.26 |
| Histidine[d] (HIS) | 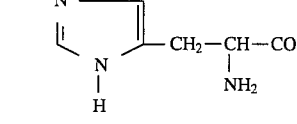 | 4.35 | 0.16 | 4 | 4.39 | 3.43 |
| Tyrosine (TYR) | 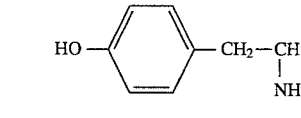 | 4.11 | 0.35 | 1 | 3.70 | 3.69 |
| Ornithine[c] (ORN) | $H_2N-(CH_2)_3-CH-COOH$ <br> $\quad\quad\quad\quad\quad\quad\quad |$ <br> $\quad\quad\quad\quad\quad\quad\; NH_2$ | 0.13 | 0.018 | 1.5–3.5[B] | 0.07 | 0.10 |

[a]Taken from Ref. 1;
[b]This work, absolute values depends upon liming conditions and time;
[c]Liming indicator;
[d]Vinylsulfone hardening site.

The preparation of chain-extended gelatins by reaction with vinylsulfone hardeners, involve reactions with free amine groups (other than the α-amino group that is involved in the peptide bond formation). The vinylsulfone hardening sites are LYS, HYL, and HIS which contain free amine groups. To produce a chain-extended APO gelatin that is useful in the photographic systems, it is important that after the chain-extension process, sufficient quantities of amine groups still remain in order to produce a hardenable gelatin. Table IV also shows the amino acid composition of further ion exchanged APO gelatin of Example 4 compared to the parent, that of Example 2. It is seen in the comparison that the amino acid compositions of these two samples are identical except for the $NH_3$ content, which is expectedly reduced by the ion exchange process. The CE-APO gelatin of Example 8 in which the largest amount of [H-1 @ 0.8% BOGW] was used is also shown in Table IV. The high level of (H-i) is clearly reflected in the amino acid composition of CE-APO gelatin of Example 8. In comparison with those of the parent APO gelatin of Example 4, it is observed that the amino acid compositions of the two gelatin samples are identical within experimental variability except for the hardening indicators such as LYS, HYL, and HIS. In the CE-APO gelatin (Example 8), it is seen that LYS, HYL, and HIS contents are significantly lower providing evidence of chain extension. However, it is evident that only a fraction of the hardening sites were, in reality utilized to produce chain extension, so that the resulting CE-APO gelatin still contained sufficient hardening sites for utility in photographic systems.

EXAMPLES 9–11

Preparation and Characterization of Model AgBr Emulsions Using CE-APO Gelatin of Example 3

A. Preparation of the Emulsions

The preparations of the AgBr emulsion were carried out by the so-called "double jet precipitation technique"[1,7] (see equipment in FIG. 2) using CE-APO gelatin of Example 3 and APO gelatin of Example 2. The $AgNO_3$ (Eastman Kodak Company, Emulsion Grade) and NaBr (Eastman Kodak Company, Reagent Grade) stock solutions were made up at 3.5M each and at pH=6.0. Ten grams of the precipitation gelatins was premelted at 45° C. in 1000 mL of distilled water at pH=6.0. After dissolution and melting, the temperature was lowered to 35° C. The gelatin solution was placed in the stirred precipitation kettle (104) of FIG. 2. The constant temperature bath (136) was filled with water (138) and maintained at 35° C. The precipitation kettle was fitted with a stirrer (116) and a silver-ion-sensing electrode (122) with an automatic temperature compensation probe (140). The electrode system was attached to a pAg controller (120) which measured and controlled the pAg and recorded the values on a strip chart recorder (130). The silver ion (102) and halide ion solutions (98) were added simultaneously to the kettle (104). The $Ag^+$ flow rate was preset to different values to obtain AgBr emulsion grains of different sizes. $Ag^+$ was pumped at the preset flow rates using pump (112) through tube (114) into the reaction kettle. The $Br^-$ was pumped automatically into the precipitation kettle through tube (121) by the proportionally controlled pump (118), which was controlled by the pAg controller. The pAg controller sensed the pAg of the precipitation chamber and moderated the pumping rate of the $Br^-$ solution to maintain the pAg set at the pAg controller unit. In all precipitations pBr was controlled at 3.0. The pAg and pBr of the precipitation chamber is related to each other by the solubility product, $pK_{sp}$, relationship (R-9).

$$pAg + pBr = pK_{sp}$$

Table V shows the precipitation conditions of the AgBr emulsions prepared using parent APO gelatin of Example 2 and CE-APO gelatin of Example 3.

Electron photomicrographs of the precipitated emulsions of Examples 9–11 are shown in FIG. 4. It is well known that crystal formation in condensation precipitation takes place via steps of first nucleation and then growth of the crystals (R-7). It is seen in Table V and FIG. 4 that the faster the $Ag^+$ (and $Br^-$) flow rates, the smaller are the AgBr crystal size, as faster precipitation is dominated by nucleation rather than growth. Conversely, slower precipitation with longer run times produced larger sized particles, as expected. Visual examination of the micrographs of FIG. 4 indicates that the emulsion crystals are rounded octahedra (almost spherical) with fairly narrow size distribution and also that the repeat runs with APO or CE-APO gelatins produced crystals with very similar particle size and uniformly. The particle size and size distributions of the emulsions were measured by two methods. The first involved image analysis of between 1000 to 2000 particles in the electron micrographs. All samples showed distributions that followed the log-normal law (R-10). The geometric mean diameter, $\overline{D}_g$, for log-normal distributions are shown for all examples in Table V. $\overline{D}_g$ is defined as follows:

$$\overline{D}_g = \sqrt[n]{\left[ \prod_{i=1}^{i=n} D_i \right]}$$

TABLE V

Conditions for the Precipitation of AgBr Emulsions using APO and CE-APO Gelatins at pBr = 3; pH = 6 and at 35° C. and Their Particle Size Characteristics

| Emulsion Example [Gelatin Used] | Silver Ion Flo Rate (mL/min) | Duration of $Ag^+$ (and $Br^-$) Flow (min) | Particle Diameter in Microns | | Photon Correlation Spectroscopy After Proteolytic Enzyme Treatment of Emulsion (scattering angle 90°) |
|---|---|---|---|---|---|
| | | | Image Analysis of Electron Micrograph | | |
| | | | Geometric Mean | Geometric Std. Dev.[a] | |
| Example-9A [CE-APO Gelatin of Example-3] | 20.0 | 2.86 | 0.033 | 1.21 | 0.0350 |
| Example-9B [APO Gelatin of Example-2] | 20.0 | 2.86 | 0.034 | 1.22 | 0.0367 |
| Example-10A [CE-APO Gelatin of Example-3] | 2.50 | 22.9 | 0.047 | 1.19 | 0.0494 |
| Example-10B [APO Gelatin of Example-2] | 2.50 | 22.9 | 0.051 | 1.19 | 0.0546 |
| Example-11 [CE-APO Gelatin of Example-3] | 0.312 | 182.4 | 0.085 | 1.10 | 0.0893 |

[a]Geometric standard deivation is a unitless number and equals 1.00 for monodisperse systems.

where $D_i$ is the diameter of the $i^{th}$ particle of a total n particles. It is seen from the data of Table V that the particle sizes of equivalent runs using APO or CE-APO gelatins are about the same. The width of the distribution is characterized by the geometric standard deviation, $\sigma_g$, defined as $$\log \sigma_g = \sqrt{\left[\frac{\sum_{i=1}^{i=n} n_i (\log D_i - \log \overline{D}_g)^2}{\text{sig}i=ni=1\ n_i}\right]}$$

where $n_i$ is the number of particles with diameter $D_i$, $\sigma_g$ is a number without a unit and is unity for perfectly monodisperse systems. It is seen in Table IV that $\sigma_g$ values of all the emulsions indicate reasonably narrow size distributions, and that the identical runs with APO or CE-APO gelatins produced similar widths of distributions.

Photon correlation spectroscopy (PCS, R-11) after proteolytic enzyme treatment was another procedure utilized to determine the core diameters of the AgBr microcrystals. It is well known (R-7) that proteolytic enzymes can digest gelatin to the individual amino acids. Thus, such a treatment is expected to remove the peptizing gelatin shell from around the emulsion crystals. The enzyme treatment procedure was as follows: Tenth of a mL of the raw emulsion was added to 10 mL of distilled water. Then was added 0.1 mL of a 10% solution of the proteolytic enzyme Takamine. The mixture was stirred at 45° C. for about 30 minutes prior to PCS measurements at 90° scattering angle. The determined core diameter by PCS is also shown in Table V. Those values are consistently about 5 to 7% larger than the electron microscopic image analysis numbers. The larger size may result from the fact that PCS provides an intensity average number which is weighted by the 6th power of the particle diameter, a result which would weight the distribution (though narrow) to larger particles. Differences of 5 to 7% in the particle diameters obtained by the two methods are not unusual. Despite that small difference, both measurements indicated the same trends.

It is concluded in this section that under similar precipitation conditions, CE-APO gelatin produces stable silver halide emulsions that are similar in particle size and size distribution to those of the parent APO gelatin.

B. Microelectrophoretic Characterization of CE-APO Gelatin Coated AgBr Crystals Using Emulsion of

EXAMPLE 10B

Figure 5:
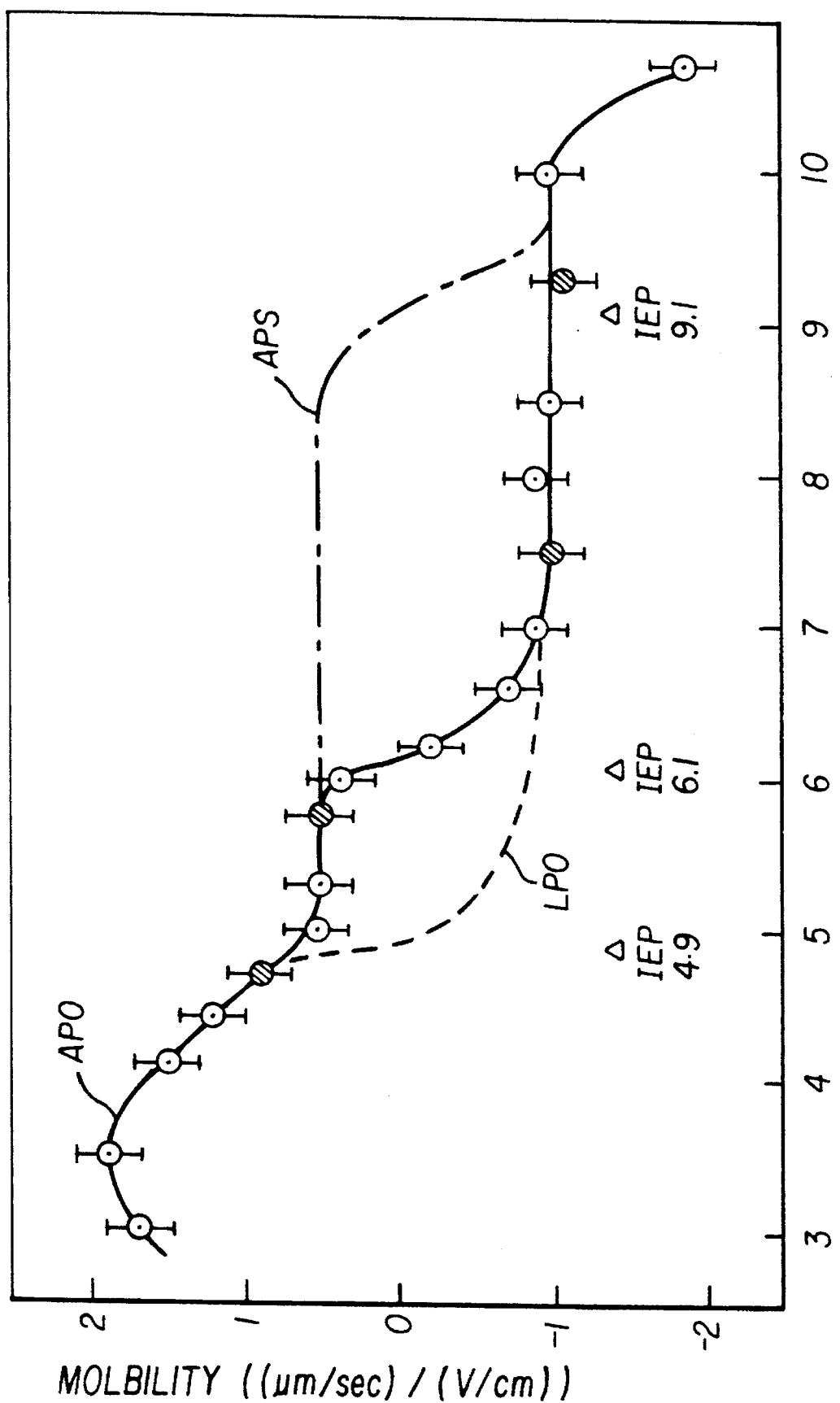
FIG. 5 illustrates microelectrophoretic charge profiles of various gelatins as a function of pH.

The determination of the microelectrophoretic mobility of protein or gelatin coated particles such as AgBr emulsions as a function of pH provides a measure of the net particle charge on the protein as a function of pH and also the PZC or the IEP value (R-7, R-8). The electrokinetic mobility profile of APO gelatin of Example 2 was determined using emulsion of Example 10B as described earlier (R-8). To improve observations of particle migration, the emulsion was ripened at pBr=50° C. for 2 hours at pH of about 6.0. The cross-hatched points were determined using the same gelatin absorbed on $BaSO_4$ (MCB reagent grade). It is observed in FIG. 5 that the IEP (or PZC) of the APO gelatin is 6.1, compared to a value of pH of 5.7 as determined earlier by the mixed bed ion exchange process (R-7). This is a small difference and it is suggested that the two very different procedures of measuring its IEP value give essentially the same results. Microelectrophoresis provides a more quantitative change profile over a pH range. Also superimposed on FIG. 5 are earlier data (R-7) of the electorphoretic mobilities of a standard LPO gelatin and that of a non-inventive high IEP acid processed pigskin (APS) gelatin. The measurement conditions for FIG. 5 are: 35° C., pBr=3.0 and potassium nitrate concentration of 0.0038M. It is clear from FIG. 5 why LPO and APS gelatin are not compatible in normal pH ranges of photographic applications. Between pH values of 5.9 and 9.1, those gelatins are oppositely charged and cause coacervation upon mixing. As a result AP gelatins, even though much less expensive to manufacture, are not often used in photographic systems. The APO gelatin of Example 2 and other APO and CE-APO gelatins (see Table II) have IEP values close to pH of 6 with only a low positive charge region between pH of 5.9 and 6.1, thereby enabling the mixing of CE-APO gelatins of our invention with LPO gelatins without observable coacervation in this pH range. Since gelatins are extremely polydispersed macromolecules, they have IEP ranges rather than single IEP values (R-2). Therefore, the CE-APO gelatin of this invention, with IEP values within one pH unit of that results in much superior compatibility with LPO gelatins than that of the LPO gelatin, observed for high IEP APO gelatins or APS gelatins. This is a prime advantage of the CE-APO gelatin of our invention. The CE-APO gelatin precipitated emulsion of Example 10A was mixed with the LPO gelatin of Example 1 at equal gelatin concentrations at pH of 5.5 at 40° C., and no coacervation incompatibility was observed indicating an advantage of this invention. It is expected that the prepared emulsions with proper chemical and spectral sensitization would demonstrate similar photographic sensitivity as similarly precipitated AgBr emulsion using conventional LPO gelatins. It is to be noted that the experiment of FIG. 5 was performed at a constant $KNO_3$ concentration of $3.8 \times 10^{-3}$ M. The contribution to ionic strength from the ash content of 0.15% CaO is much less than this number. Therefore, adjustment of ionic strength to $3.8 \times 10^{-3}$ M of $KNO_3$ is sufficient to override any contribution from the gelatin ash contents in the physical measurements presented here.

Figure 6:
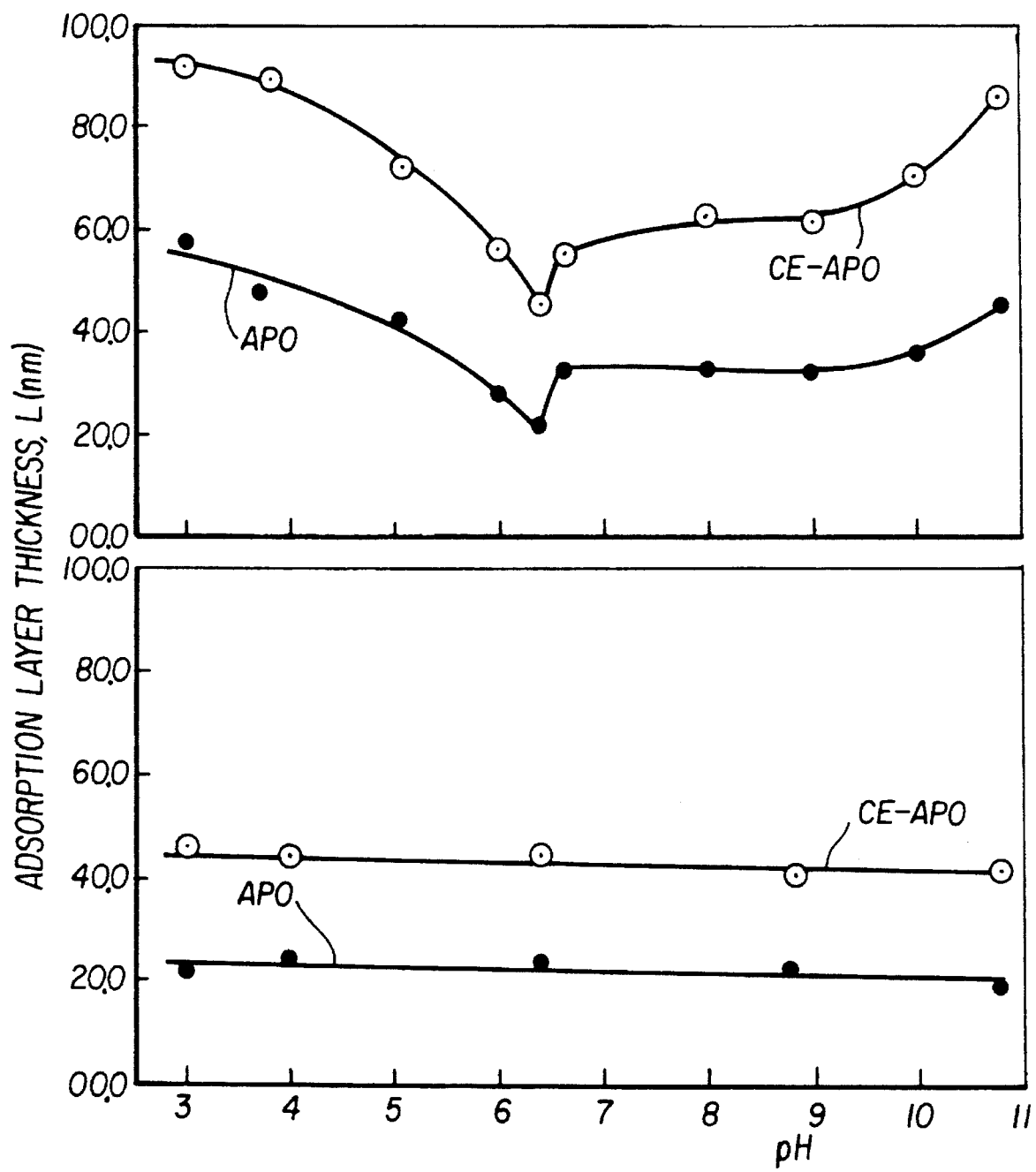
FIG. 6 illustrates the pH dependence of the adsorption layer thickness due to APO and CE-APO gelatins on AgBr surface at low electrolyte (top) and under swamping electrolyte conditions.
Figure 7:
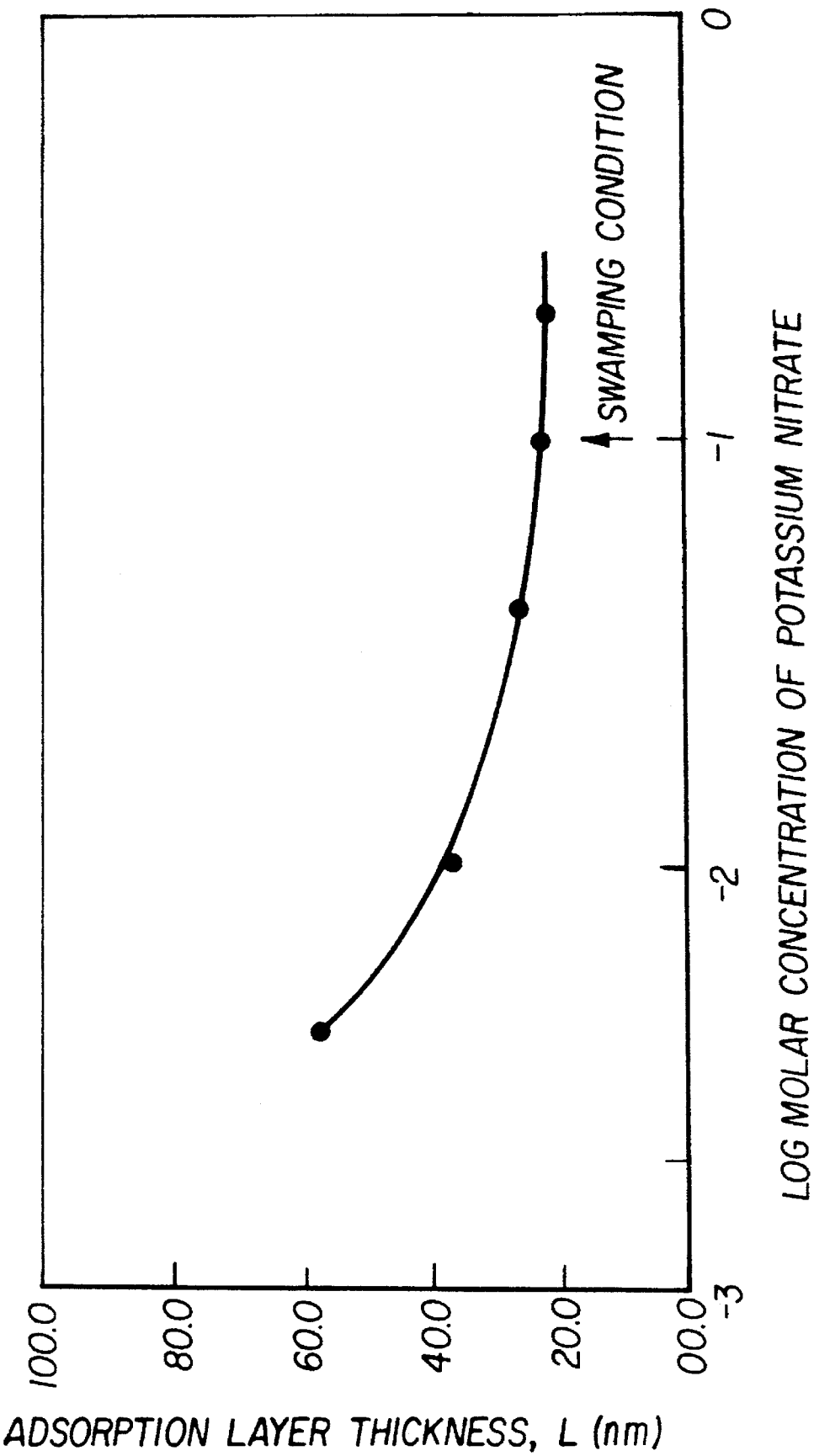
FIG. 7 illustrates the electrolyte concentration dependence of the adsorption layer thickness of APO gelatin of Example 2 on AgBr surface at pH=3.0 and pBr=3.0.
Figure 8:
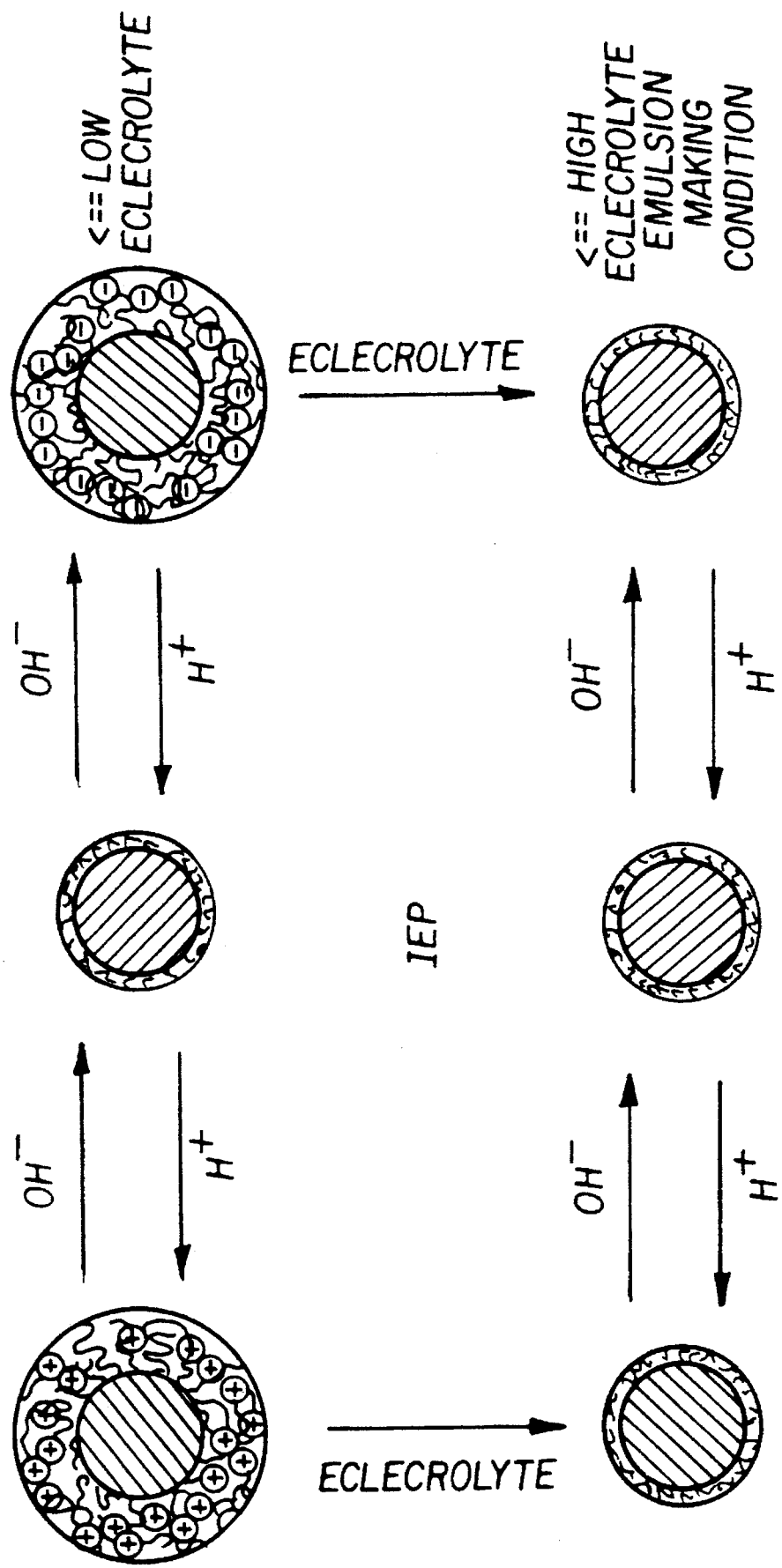
FIG. 8 illustrates the pH and electrolyte concentration dependence of the conformation of gelatin at the silver halide/water interface.

C. Characterization of the Adsorption Layer Thickness Due to APO and CE-APO Gelatins and Stability Consideration of AgBr Emulsions Precipitated Using Such Gelatins The stability of a colloidal dispersion, using a polymeric material such as gelatin, is essentially determined by the thickness of the adsorbed polymer layer around the particles (R-3). The adsorbed polymer layer acts as a steric barrier and prevents the core particles from coming close enough such that van der Waal's attraction could cause flocculation or coagulation. Therefore, characterization of the thickness of the gelatin layer around the emulsion particles is essential to determine the stability of sterically stabilized systems. The adsorption layer thicknesses of gelatin on the prepared emulsion were determined by PCS measurements of the hydrodynamic diameter of the gelatin-adsorbed AgBr grains and the core diameter (as indicated in Table V) and subtracting the latter from the former value. The adsorption layer thickness, L, of APO gelatin of Example 2 and CE-APO gelatin of Example 3 were determined using emulsions of Example 10B and Example 10A respectively under the following conditions:

Scattering Angle: 90°
t=35° C.
[AgBr]=0.0018M
[gel]=% $8.0 \times 10^{-5}$ g/mL
pBr=3.0
KNO=$3.8 \times 10^{-3}$M Results are shown in FIG. 6 (top). [FIG. 6 shows the pH dependence of the adsorption layer thickness due to APO gelatin of Example 2 on AgBr grains of Example 10B and that of CE-APO gelatin of Example 3 on AgBr grains of Example 10A, at potassium nitrate concentration of 0.0038M (top) and 0.2M (bottom)]. It is seen that the gelatin layer thickness is minimum close to the IEP. But, the layer thicknesses are considerably larger below and above the IEP, as a result of charge expansion of the adsorbed layer. The adsorbed layer is positively charged below the IEP and negatively above the IEP. The charge expansion can be swamped with electrolyte. FIG. 7 shows the dependence of the adsorption layer thickness on electrolyte ($KNO_3$) concentration under the following conditions:

Scattering Angle: 90°
t=35° C.
[AgBr]=0.0018M
[gel]=8.0×10$^{-5}$ g/mL
pBr=3.0 of APO gelatin of Example 2 using the emulsion of Example 10B. It is seen that the adsorption layer thickness with the addition of $KNO_3$ shrinks and levels off at a $KNO_3$ concentration of 0.1M. In other words, the charge expansion effect is swamped at a concentration of $10^{-1}$ $KNO_3$. FIG. 6 (bottom) shows the adsorption layer thicknesses of APO gelatin and CE-APO gelatin as a function of pH under swamping electrolyte concentration ($2\times10^{-1}$M $KNO_3$). The bottom curve of FIG. 6 shows that under swamping electrolyte concentrations, the gelatin adsorption layer thickness is independent of pH and has about the same value as that of the IEP at low electrolyte concentration. Since actual emulsion making takes place at high electrolyte concentrations, the pH independent swamping electrolyte adsorption layer thickness is the determining criterion for stability. It is seen in FIG. 6 that the CE-APO gelatin has a larger adsorption layer thickness than the parent APO gelatin, a result due to the much higher molecular weight of the CE-APO gelatin than that of the parent APO gelatin (FIG. 3, Table I). The conditions under which the high electrolyte measurements of FIG. 6 were performed are as follows:

Scattering Angle: 90°
t=35° C.
[AgBr]= 0.0018M
[gel]=8.0×10$^{-5}$ g/mL
pBr=3.0
KNO=0.2M The compression and expansion of the adsorption layer thickness of gelatin as a function of electrolyte concentration and pH is explained in FIG. 8.

Figure 9:
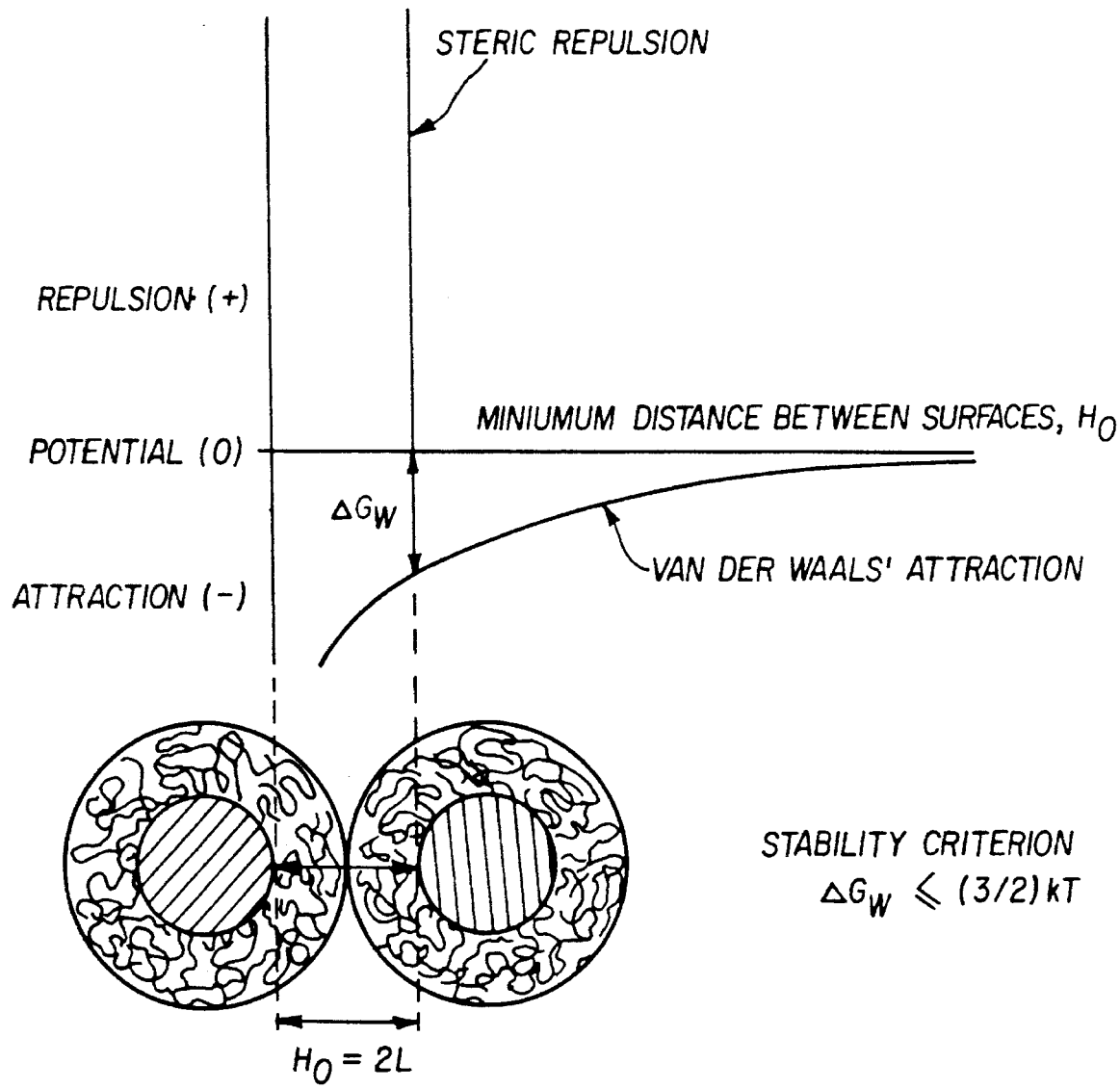
FIG. 9 illustrates the principles of colloid stability of silver halide emulsion particles under high electrolyte precipitation condition.

FIG. 9 illustrates the stability criterion of sterically stabilized colloidal systems (R-3). Typically, the destabilizing van der Waal's attraction causes colloids to flocculate or agglomerate. Steric repulsion at the distance of minimum surface separation of $H_o=2L$ provides colloid stability. The steep potential barrier due to polymer adsorption layer at $H_o=2L$ creates a potential minimum, $\Delta G_w$, called the secondary minimum (R-3). If the depth of the secondary minimum is smaller than the energy available in Brownian motion (1.5 kT, k= Boltzmann constant and T absolute temperature), the particles bounce back after Brownian collision and provide a stable dispersion. Since $\Delta G_w$ occurs at $H_o=2L$ for CE-APO gelatins and L is larger than that in APO gelatins (FIG. 7), CE-APO gelatins, because of their larger molecular weight, should provide better colloidal stability than APO gelatin.

The invention has been described in detail with particular reference to preferred embodiments thereof, but it will be understood that variations and modifications can be effected within the spirit and scope of the invention.

We claim:

1. A composition comprising silver halide grain, lime processed ossein gelatin, and chain-extended acid processed ossein gelatin (APO) wherein said chain-extended ossein gelatin has an isoelectric pH between 5.5 and 6.5, a viscosity between 7 and 11 cP (m P sec) at 40° C. and at a concentration of 6.16% in distilled water at a shear rate below 100 1/sec, said chain-extended ossein gelatin has a high molecular weight fraction, having a molecular weight of greater than 285,000, of about 18 to about 60 percent weight fraction gelatin by area said chain-extended acid processed ossein gelatin is chain extended using a bis-(vinyl sulfonyl) chain-extension agent of the following structure;

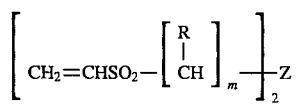

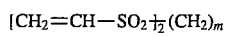

in which m is an integer of from 1 to 4, Z is oxygen, nitrogen, or sulfur, and R is hydrogen or lower alkyl, and said chain-extension agent is used in the range of from about 0.25 to about 5 millimoles per 100 g of gelatin dry weight.

2. The composition of claim 1 wherein said silver halide grains comprise cubic, octahedral or tabular crystal structures.

3. The composition of claim 1 wherein said silver halide grains comprise silver bromoiodide, silver chloride, or silver bromide.

4. The composition of claim 3 wherein said chain-extension agent comprises bis-(vinyl sulfonyl) methane or bis-(vinyl sulfonyl methyl) ether.

5. The composition of claim 3 wherein the chain-extension agent is used to prepare the CE-APO gelatin is a range of from about 1 to about 3 millimoles per 100 g of gelatin dry weight.

6. The composition of claim 1 wherein R is a lower alkyl consisting of methyl, ethyl, isopropyl, butyl, or pentyl.

* * * * *